US007647637B2

(12) United States Patent
Schuba et al.

(10) Patent No.: US 7,647,637 B2
(45) Date of Patent: Jan. 12, 2010

(54) COMPUTER SECURITY TECHNIQUE EMPLOYING PATCH WITH DETECTION AND/OR CHARACTERIZATION MECHANISM FOR EXPLOIT OF PATCHED VULNERABILITY

(75) Inventors: Christoph L. Schuba, Menlo Park, CA (US); Dwight F. Hare, Encinitas, CA (US); Gabriel E. Montenegro, Redmond, WA (US)

(73) Assignee: Sun Microsystems, Inc., Santa Clara, CA (US)

( * ) Notice: Subject to any disclaimer, the term of this patent is extended or adjusted under 35 U.S.C. 154(b) by 847 days.

(21) Appl. No.: 11/207,341

(22) Filed: Aug. 19, 2005

(65) Prior Publication Data

US 2007/0044153 A1   Feb. 22, 2007

(51) Int. Cl.
 *G06F 11/00* (2006.01)
(52) U.S. Cl. .......................................... 726/25; 726/23
(58) Field of Classification Search .................. 726/22, 726/24–25; 713/188
 See application file for complete search history.

(56) References Cited

U.S. PATENT DOCUMENTS

| 2005/0273857 | A1* | 12/2005 | Freund ......................... 726/23 |
| 2006/0095965 | A1* | 5/2006 | Phillips et al. ................. 726/22 |
| 2006/0265750 | A1* | 11/2006 | Huddleston ................... 726/24 |

OTHER PUBLICATIONS

Frank, Diane, "Agencies lack infosec resources", from Federal Computer Week: www.fcw.com, pp. 1-2, published Mar. 14, 2005.

Beattie, Steve et al., "Timing the Application of Security Patches for Optimal Uptime", Proceedings of LISA 2002: 16th Systems Administration Conference, Philadelphia, Pennsylvania, USA, pp. 233-242, published by USENIX Association, Nov. 3-8, 2002.

Provos, Niels, "A Virtual Honeypot Framework", CITI Technical Report 03-1, pp. 1-12, Oct. 21, 2003.

Rescorla, Eric, "Security holes . . . Who cares?", Proceedings of the 12th USENIX Security Symposium, Washington, D.C., pp. 75-90, published by USENIX Association, Aug. 4-8, 2003.

Kloet, Jeff, "A Honeypot Based Worm Alerting System", SANS Infosec Reading Room, pp. 1-16, Jan. 3, 2005, www.sans.org/rr/whitepapers/detection/1563.php.

* cited by examiner

*Primary Examiner*—Jung Kim
*Assistant Examiner*—Samson B Lemma
(74) *Attorney, Agent, or Firm*—Park, Vaughan & Fleming LLP

(57) ABSTRACT

A patch or set of patches may be deployed, often to a subset of potentially vulnerable systems, to address a particular vulnerability while providing a facility to monitor and, in some cases, characterize post-patch exploit attempts. Often, such a patch will check for an exploit signature and, if an exploit attempt is detected or suspected, take an appropriate action. For example, the patch may include code to log indicative data or trigger such logging. In some exploitations, the patch may generate or contribute to a warning or advisory regarding an additional target (or targets) of the exploit and, if appropriate, initiate a patch or protective measure for the additional target(s). In some exploitations, the patch may simulate responses or behaviors suggestive (to an attacker) of unpatched code. In some exploitations, the patch may direct an exploit attempt to a service (or simulated service) hosted or executing in an isolated protection domain.

23 Claims, 5 Drawing Sheets

COMPUTER SECURITY TECHNIQUE EMPLOYING PATCH WITH DETECTION AND/OR CHARACTERIZATION MECHANISM FOR EXPLOIT OF PATCHED VULNERABILITY

BACKGROUND

1. Field of the Invention

The present invention relates generally to computer security, and more particularly, to techniques for patching vulnerabilities while facilitating detection, characterization and/or prediction of subsequent attempts to exploit a patched vulnerability.

2. Description of the Related Art

The vulnerability of computer systems, configurations, software and information codings and protocols to unauthorized access or use is widely recognized, at least by information security professionals. These vulnerabilities range from minor annoyances to critical national security risks. Today, given the ubiquitous nature of internet communications and the value of information and transactions hosted on the public internet, vulnerabilities are discovered and exploited at alarming rates. Automated tools facilitate the probing of systems and discovery of vulnerable systems and configurations. Once vulnerabilities are identified, exploits can be globally disseminated and employed.

Patches (or updates) seek to address known vulnerabilities. However, even after vulnerabilities and/or exploits are identified and patches created, vulnerabilities persist in many system or software instances because patches are not universally distributed or installed. In some cases, users and administrators are simply unaware of the vulnerabilities or patches. In some cases, the flux of security patches or number of systems requiring update can be daunting, frustrating or overwhelming even for the most vigilant of users or administrators. In some cases, patches themselves have been known to create new problems, vulnerabilities or incompatibilities. As a result, many users and organizations prefer not to be early adopters of patches, even those that purport to address critical security risks.

While substantial corporate and government resources have been dedicated to the identification of threats, distribution of advisories, and mitigation of vulnerabilities, software and computer system vendors, users and administrators are often faced with two basic strategies: (i) patch early, often and universally or (ii) patch only after vulnerabilities are well characterized and patches are stable.

SUMMARY

A strategy of early and universal adoption of patches can impose huge monitoring and deployment costs on organizations. In addition, such a strategy tends to expose operational systems to early version risks. Furthermore, the ability to monitor and characterize an attack strategy or set of targets (as yet unknown) may be eliminated by simply shutting down the known attack vector. On the other hand, delay can leave systems and networks (including critical systems and networks) open to attack, intrusion and/or compromise of information.

Recognizing these and other problems, we have developed techniques whereby a patch or set of patches may be deployed, often to a subset of potentially vulnerable systems, to address a particular vulnerability while providing a facility to monitor and, in some cases, characterize post-patch exploit attempts. Often, such a patch will check for an exploit signature and, if an exploit attempt is detected or suspected, take an appropriate action. For example, the patch may include code to log indicative data or trigger such logging. In some exploitations, the patch may simulate responses or behaviors suggestive (to an attacker) of unpatched code. In some exploitations, the patch may direct an exploit attempt to a service (or simulated service) hosted or executing in an isolated protection domain.

In general, our techniques may be employed in patches to code, including code that implements services, applications, operating system components, firmware, protocol stacks, libraries, plug-ins, applets etc. Patches may be source level, compiled code or script, or binary patches, as appropriate, and may be distributed as modifications or recipes for modification of any software component or as a replacement versions of a given software component or components.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The description that follows presents certain illustrative embodiments of a computer security technique that employs patches to fortify at least selected systems against a particular vulnerability, while also including functionality to allow detection and/or characterization of subsequent attempts to exploit the patched vulnerability. In this way, we seek both to address a given vulnerability and to provide facilities for characterization and possible interdiction further attempts to exploit the vulnerability.

Our techniques are generally applicable to many classes of vulnerabilities and we describe our methods broadly. However, for clarity of description we focus in certain illustrative threat scenarios and practical realizations. For example, we draw upon a relatively simplistic buffer overflow security vulnerability to illustrate certain aspects of some applications of our techniques. It is convenient to explain our techniques in the context of vulnerable (and patched) services. Indeed, many vulnerabilities, and therefore many realizations of the present invention, involve services. However, more generally, the techniques of the present invention may be employed in a wide variety of contexts, including code that implements services, applications, operating system components, firmware, protocol stacks, libraries, plug-ins, applets etc. Finally, we draw upon exploit scenarios in which a payload may be delivered in furtherance of an attack or intrusion and for which analysis may provide information useful in thwarting future attacks/exploits/intrusions and/or in guiding further patch deployments. However, other information, such as source of an attack or even the information that an exploit has been attempted despite other security measures may be valuable in some situations.

Accordingly, in view of the above, and without limitation we now describe certain illustrative embodiments in accordance with the present invention.

Illustratative Distributed Computing Environment

Figure 1:
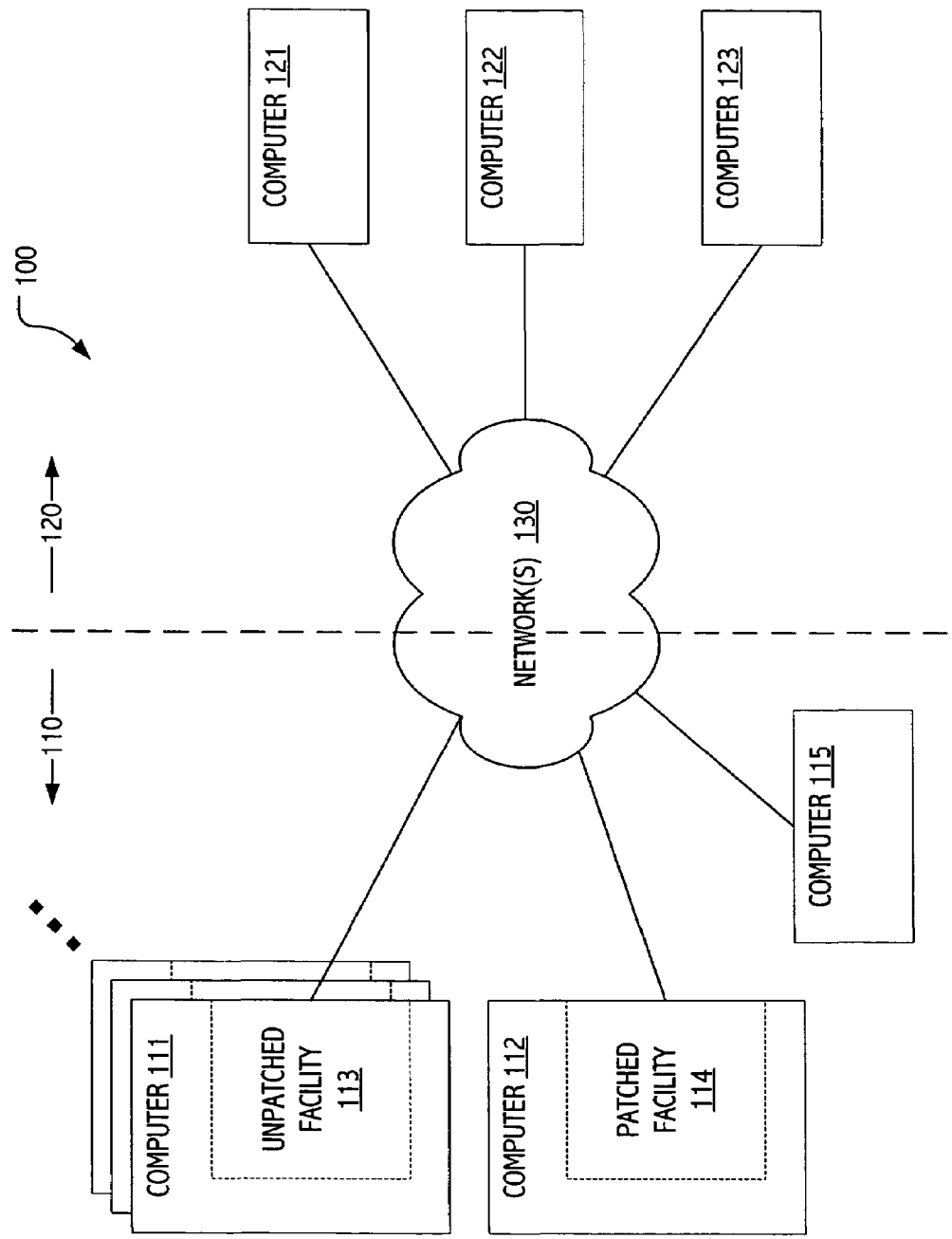
FIG. 1 depicts a networked computing environment in which security techniques in accordance with some embodiments of the present invention may be understood and employed.

FIG. 1 illustrates a distributed computing environment 100, including computers 111, 112, 115, 121, 122 and 123 that may communicate via a network 130. We use the illustration of FIG. 1 to describe certain realizations in accordance with the present invention and to illustrate certain threat and patch deployment scenarios; however, based on the description herein, persons of ordinary skill in the art will appreciate a wide variety of alternative realizations and scenarios.

In general, network 130 includes any type of wired, wireless or optical communication channel(s) capable of coupling computing nodes. For example, suitable networks may include, but are not limited to, a local area network, a wide area network, or combinations of networks and/or intermediate computing nodes. In some realizations of the present invention, at least part of network 130 includes the Internet.

In general, computers 111, 112, 115, 121, 122 and 123 are of any of a variety of designs and configurations. For example, any given one of the computers may be (or may include) a microprocessor, mainframe computer, server, desktop or laptop computer, network communications device, digital signal processor, portable computing device, personal organizer, device controller or a computational engine within an appliance.

For purposes of illustration, we depict two computers (111 and 112) for which a given vulnerability may be relevant. Computer 112 is representative of one (or more) computer(s) for which a patch in accordance with some embodiments of the present invention is applied. Computer 111 is representative of one (or more) computers that may (at least temporarily) remain vulnerable and unpatched. Alternatively in some environments or threat scenarios, one or more computers represented illustratively by computer 111 may themselves be patched or otherwise protected. In some cases, patches applied to such computers may omit some or all of the detection and characterization mechanisms described herein.

As illustrated and described herein, computers 111 and 112 are part of a physical, network, or administrative grouping 110 for which at least some level of security policy and patching strategy is implemented. Accordingly, in large physical, network, or administrative groupings or in situations where patch instability risks generally outweigh a short-term security risk, it may be desirable to patch only selected systems (e.g., computer 112) rapidly, while employing detection and characterization mechanisms described herein to guide further patch deployments or other interdiction efforts. Such a strategy may be particularly desirable if the systems selected for deployment of the patch are situated such that they function as attractive "honeypots" for exploit attempts. Other computers (e.g., computer(s) 111) may be patched later, once administrative bandwidth permits or once confidence in the stability of a patch allows an orderly rollout.

In general, the decision regarding which systems to initially patch using techniques that include detection and/or characterization mechanisms can be application-, installation- and/or personnel-specific. In some situations, the computer(s) patched may be selected from those, such as web servers, that are more generally exposed to public internet traffic. In some situations, the computer(s) patched may be selected from those that host or access more critical or sensitive information. In some situations, computer(s) that host mission-critical functions may remain unpatched due to stability concerns.

FIG. 1 also depicts additional computers 115, 121, 122 and 123 from (or via) which hypothetical attacks, exploits or intrusion attempts against computers such as computers 111 and 112 may originate or travel. Note that while computers 121, 122 and 123 reside outside (120) our physical, network, or administrative grouping 110, e.g., at business partners or client sites, with home users, in Internet cafes or elsewhere), at least some attack, exploit or intrusion vectors may originate from or travel via computers (e.g., computer 115) within physical, network, or administrative grouping 110.

Examples of an Instrumented Patch Technique

Figure 2:
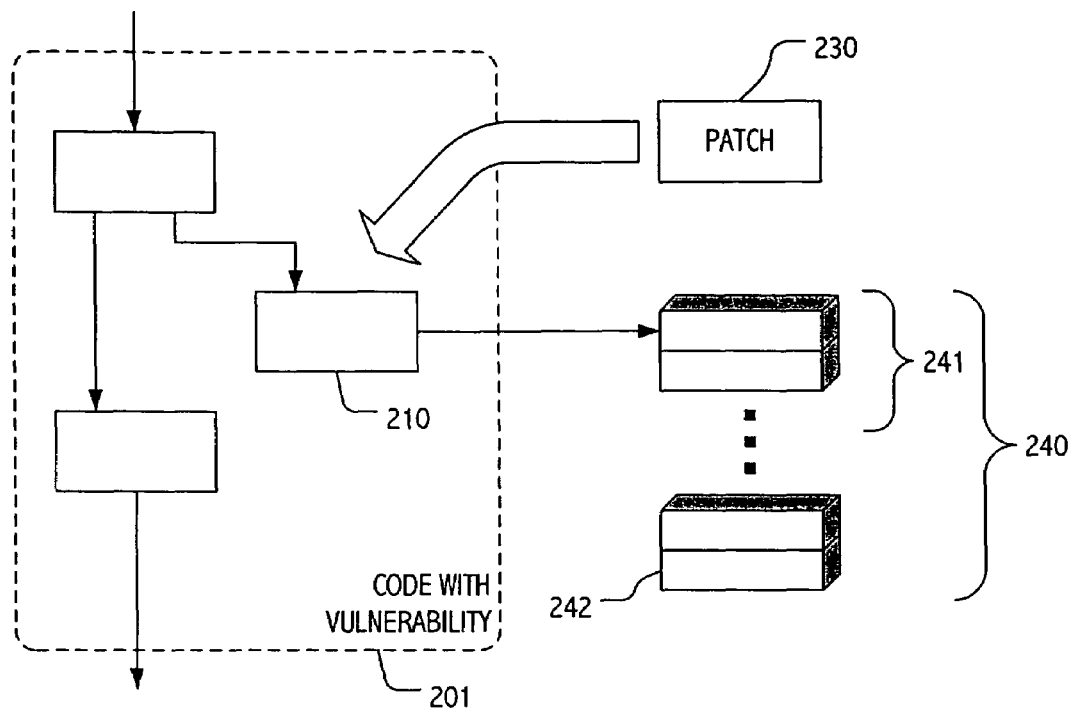
FIG. 2 illustrates the introduction of a patch embodying some techniques of the present invention. The patch is introduced into code implementing a service that has a vulnerability and provides one or more mechanisms for detection and/or characterization of post-patch attempts to exploit the patched vulnerability.

FIG. 2 illustrates introduction of a patch 230 embodying some techniques of the present invention. The patch is introduced into code 201 implementing a service, application, operating system component, firmware, protocol stack, library, plug-in, applet, etc. that has vulnerability (or which may be used to exploit a vulnerability elsewhere). In addition to corrective code, patch 230 provides one or more mechanisms for detection and/or characterization of post-patch attempts to exploit the patched vulnerability.

Referring illustratively to FIG. 2, code 201 may implement any service, daemon or handler other facility that receives information and takes action based thereon. One commonly exploited attack vector is the buffer overflow attack, in which an exploit typically causes vulnerable code to write data to memory in such a way that locations other than the overt write target are updated. For example, if a write operation improperly writes 2 KBytes of data to a 128 Byte data structure, memory locations may be updated beyond the data structure intended by the original programmer. With knowledge of the memory map and appropriate selection of the data written, operation of code 201 (or other code) may be purposefully affected in a way that impacts security. For example, level of privilege may be changed, function pointers may be updated to instead reference malicious code, etc.

FIG. 2 illustrates such a situation in which a portion 210 of code 201 includes an unchecked, unbounded write, ostensibly to a data structure 241 represented in memory 240, but which may be exploited to maliciously update contents of location 242. In some cases, the particular update may be generic (such as elevating privilege to that of a "root" account) and provide little additional information. However, in other cases, the update may include information that identifies (or could allow forensic analysis to identify) a particular account, target, other service, source of rogue code or other instrumentality of an attack.

Figure 3:
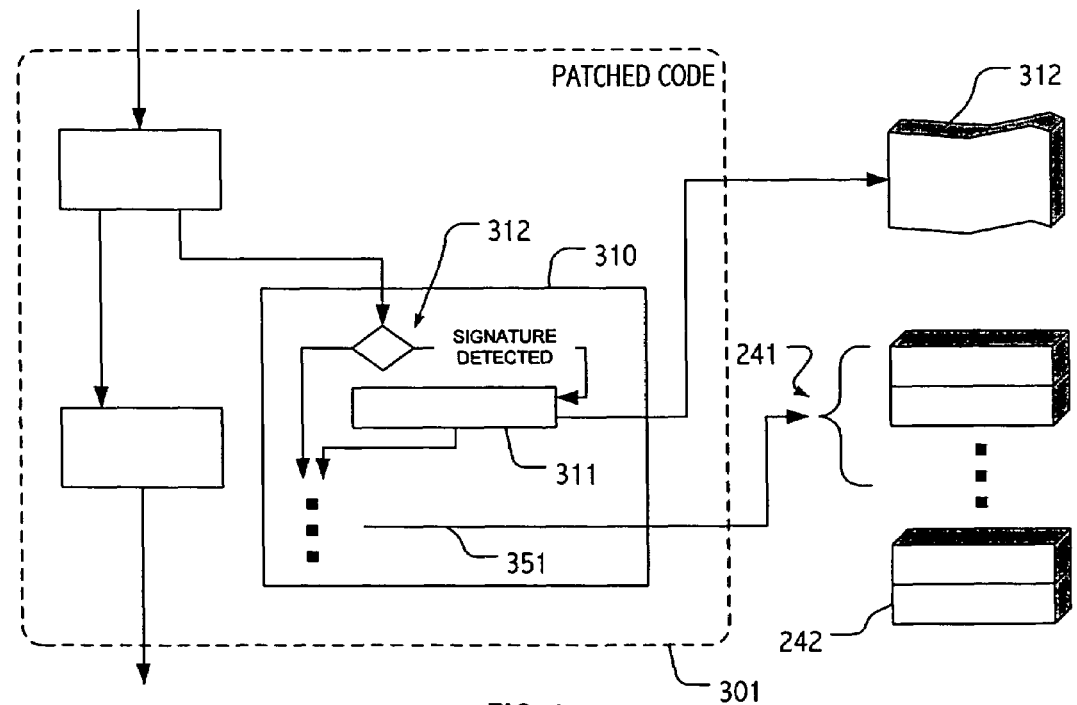
FIG. 3 illustrates a patched service employing techniques in accordance with some embodiments of the present invention.

FIG. 3 illustrates patched code 301 employing techniques in accordance with some embodiments of the present invention. Patched code 301 functionally corresponds to previously described code 201 (see FIG. 2). However, after introduction of patch 230, portion 310 of patched code 301 includes some suitable mechanism to ensure that write 351 to data structure 241 does not update contents of location 242. One simple solution is to restrict the size of the data block written to comport with the current size of the target data structure. Any of a variety of programming techniques may be employed to achieve this or a similar goal.

In addition to addressing the buffer overflow vulnerability, patched code 301 includes a mechanism to check (312) for an attack signature and to take appropriate action 311. For example, in the buffer overflow scenario described above, even though the vulnerability is patched, it may be desirable to identify and/or characterize subsequent attempts to exploit the now patched vulnerability. In such a situation, a signature check (e.g., a check for supplied data blocks larger than 128 Bytes) may be desirable to trigger a logging event that writes the supplied data to a log 312 for forensic analysis.

In situations where the data that an exploit writes, accesses (or would otherwise attempt to write or access) are indicative of an attack vector (e.g., a targeted or already compromised account, computer, service or application; a source or location of rogue code or any other instrumentality), capture of this data may be desirable, important or even critical. For example, in the case of data written or accessed (whether actually or attempted), predictions or inferences regarding next or further targets of the exploit may be made in some exploitations in accordance with the present invention. Of note, a particular node, network, service, application, resource, account or user identity maybe directly or indirectly referenced in (or may be otherwise discernable from) the data written or accessed. In some exploitations, a warning or notice is generated to identify the probable target for protective measures or responses. In some cases, probable targets may be prioritized in a staged rollout of the instrumented patch (or of another patch). In some cases, alternative protective measures or restricted access may be deployed. In some cases, a warning to an operator, administrator or user may be appropriate.

Implementations that provide subsequent target predictions and/or warnings can employ any of a number of underlying detection strategies. For example, entity identifiers or resource locators may often be discernable based on searches consistent with regular expressions (e.g., a email address consistent with <username>@<domain> or a URL consistent with scheme>:<scheme-specific-part>). Similarly, entity lookups (e.g., in a domain naming service, directory service or registry) can also provide a source of likely next targets. These and other variations will be apparent to persons of ordinary skill in the art based on the description herein.

Figure 4:
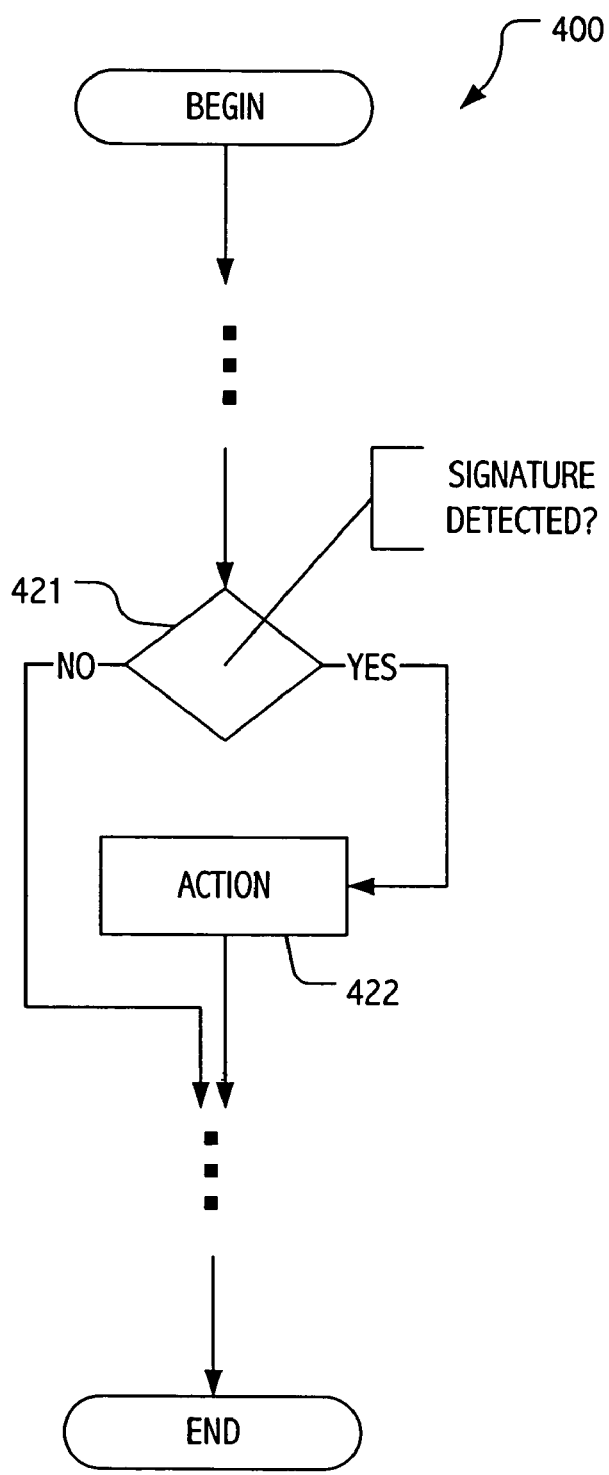
FIGS. 4, 5 and 6 illustrate several variations on techniques of the present invention. For example, in the illustration of FIG. 4, a patch in accordance with some embodiments of the present invention introduces into the execution path of a patched software component, code for detecting a signature of an exploit and taking some appropriate action. In the illustration of FIG. 5, a patch in accordance with some embodiments of the present invention introduces a branch point for simulating behavior of an unpatched instance of the code. Finally, in the illustration of FIG. 6, a patch in accordance with some embodiments of the present invention introduces both a corrective fix for vulnerable code and an attempted exploit detection mechanism that may execute largely independently of the patched code.
Figure 5:
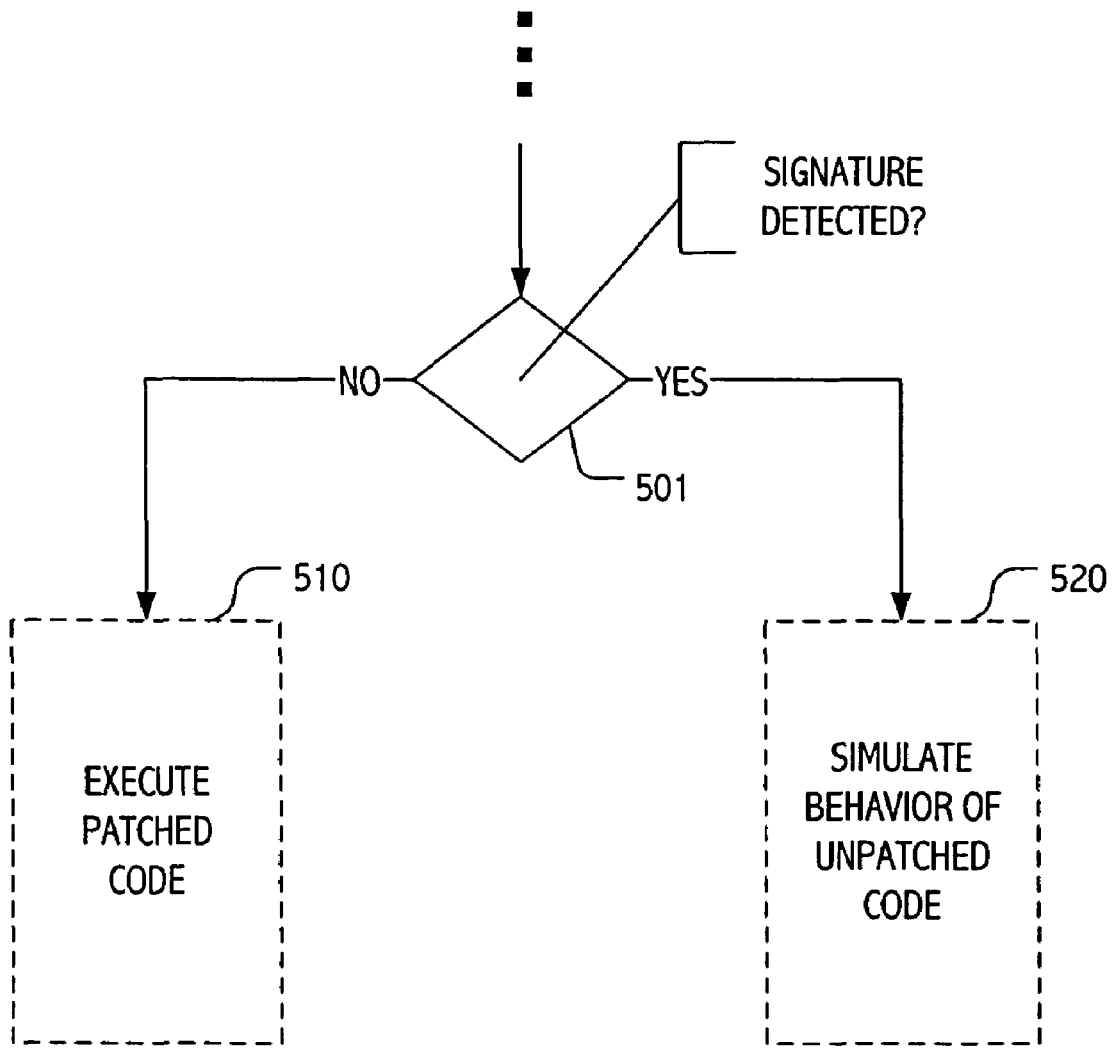
Figure 6:
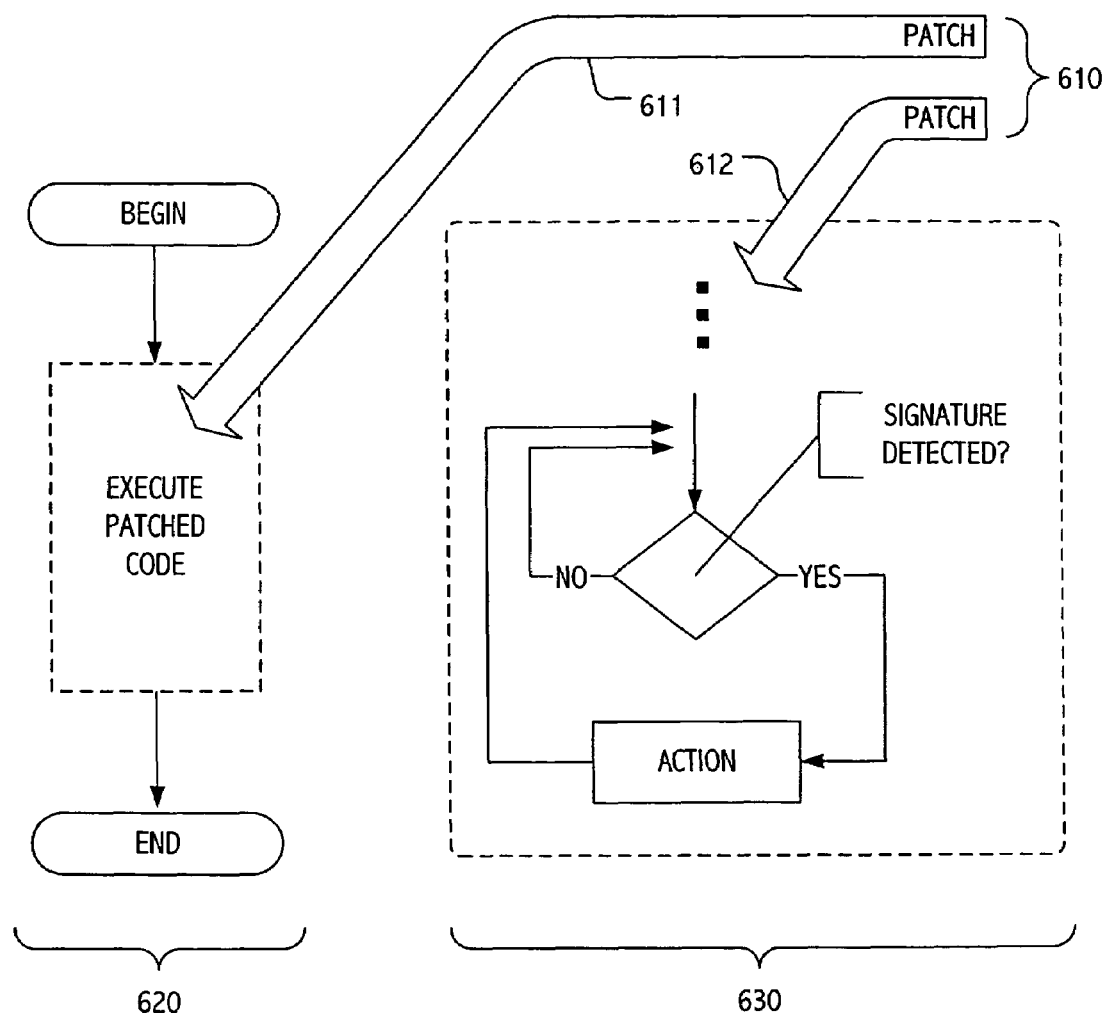

FIGS. 4, 5 and 6 illustrate several variations on techniques of the present invention. For example, in the illustration of FIG. 4, a patch in accordance with some embodiments of the present invention introduces code for detecting (421) a signature of an exploit and taking some appropriate action (422) into the execution path 400 of a patched software component. The approach is similar to that illustrated above with respect to FIG. 3; however, we now emphasize the generality of the technique.

First, the patched vulnerability may be any vulnerability (be it in the patched code or elsewhere). Second, although appropriate signatures may often be present in the information supplied (e.g., by computers 115, 121, 122 and 123, see FIG. 1) in connection with the exploit, more generally, signatures may be found in other data, events or behaviors. For example, a level or pattern of resource utilization (e.g., CPU, storage or communication), an event such a privilege upgrade, process termination, or service start/stop/restart, a violation of an invariant or an access to protected or privileged resources may constitute (or form part of) an appropriate signature in certain cases.

Third, any of a variety of appropriate responsive actions can be employed in (or result from introduction of) a patch. For example, while many appropriate responses may include logging or monitoring, logging or monitoring need not be of (or be limited to) information available in the execution context of the patched code. Indeed, in some realizations in accordance with the present invention may be configured to trigger process-, thread-, user-, resource-, port-, and/or device-specific monitoring or logging, often employing facilities or mechanisms external to the patched code. Furthermore, other appropriate actions can be employed, such as simulation of the behavior of unpatched code so as to elicit more indicative information or supplying (in response to an exploit attempt) information that could be used to trace subsequent related activity. These and other variations will be appreciated by persons of ordinary skill in the art based on the description herein.

Turning now to the illustration of FIG. 5, we highlight the use of an exploit signature and/or detection mechanism 501 (supplied in connection with a patch) to select between normal execution of code 510 (now patched) and a simulation or emulation 520 of unpatched code behavior. In realizations in accordance with FIG. 5, simulation/emulation 520 is typically supplied with the patch. In general, such a simulation or emulation may be provided using a simplified state machine. Alternatively, unpatched code can be executed in an isolated protection domain, e.g., using virtualization techniques or facilities. Monitoring and/or logging facilities can be provided in conjunction with simulation/emulation 520, if desired.

FIG. 6 illustrates an additional variation. In particular, FIG. 6 illustrates a patch 610 that introduces both a corrective fix 611 for a vulnerable code and an attempted exploit detection mechanism 612 that may execute largely independently (630) of the patched code 620. Accordingly, as previously indicated, signature detection and initiation of appropriate action need not be provided (or solely provided) in the execution sequence of the patched code. Accordingly, the viability of an exploit may be eliminated or at least partially limited by corrective fix 611, while detection/characterization facilities may be separately deployed.

Patch Deployment

Any of a variety of vehicles and/or mechanisms may be employed to deploy the patches described herein. For example, code implementing mechanisms and facilities described herein is typically stored on a computer readable storage medium, which may include any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Accordingly, any suitable computer readable storage medium or transmission medium may be employed in the distribution of patches. In general, patches may be supplied in source form, as binary patches or may take the form of updates to scripts, structured date, markup language encoded or media data. Patches may update implementations of selected software objects, modules or portions of code or may, if desirable, include or be distributed as a complete updated distribution or version of the service(s), application(s), operating system component(s), firmware, protocol stack(s), library(ies), plug-in(s) or applet(s) patched. Demand supplied, supplier pushed, automatically installed, scheduled, downloadable or "live-update" style mechanisms all represent possible deployment techniques for some realizations in accordance with the present invention.

OTHER EMBODIMENTS

Many variations, modifications, additions, and improvements are possible. For example, while applications to particular vulnerabilities and computing environments have been described in detail herein, applications to other vulnerabilities and to other environments and implementations will also be appreciated by persons of ordinary skill in the art. For example, while comparatively simple vulnerability scenarios and corrective techniques have been used to simplify description of our techniques, more subtle and complex security flaws may be addressed and more sophisticated corrective techniques may be employed in ways that employ the techniques described herein.

Plural instances may be provided for components, operations or structures described herein as a single instance. Similarly, boundaries between various components, operations and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the claims.

What is claimed is:

1. A computer security method comprising:
   patching an exploit of a vulnerability of code on a computer system;
   including, as part of the patch, a mechanism to check for a signature for subsequent attempts to exploit the vulnerability in the patched code; and
   in response to detecting a subsequent attempt to exploit the vulnerability in the patched code, the mechanism logs indicative data to characterize a post-patch attempt to exploit the patched vulnerability.

2. The computer security method of claim 1, wherein the indicative data includes one or more of:
   source information;
   data, subsystem, user, application or other target of the exploit;
   information accessed in the course the exploit;
   code introduced into the computer system and employed by the exploit; and
   payload delivered in the course of the exploit.

3. The computer security method of claim 1,
   wherein patched code logs indicative data related to a detected attempt to exploit.

4. The computer security method of claim 1,
   wherein patched code identifies, based on indicative data related to a detected attempt to exploit, at least one further target.

5. The computer security method of claim 4, further comprising, initiating in relation to the further target identification, one or more of:
   a warning regarding the further target;
   patching of the further target; and
   an additional protective measure for the further target.

6. The computer security method of claim 1, further comprising:
   directing a detected attempt to exploit the vulnerability to a corresponding implementation of the code.

7. The computer security method of claim 6,
   wherein the corresponding implementation simulates responses indicative of unpatched response to the exploit.

8. The computer security method of claim 6,
   wherein the corresponding implementation logs indicative data related to an attempt to exploit.

9. The computer security method of claim 6,
   wherein the corresponding implementation executes the exploit in a protected domain.

10. The computer security method of claim 1, wherein the vulnerability includes risk, associated with the code, of one or more of:
    an identity, authorization, access or privilege violation;
    compromise of data or a communication;
    modification of system state or configuration; and
    unauthorized or inordinate resource utilization.

11. The computer security method of claim 1,
    wherein the code implements a service, application, operating system
    component, firmware, protocol stack, library, plug-in or applet that is vulnerable to or facilitates the exploit.

12. An intrusion detection facility deployed, for each instance of monitored code, as a patched variant of the monitored code, executable on an otherwise operational computer system, the patched variant configured to check for at least one signature of at least one known exploit and thereby identify post-patch exploit attempts, the patched variant further configured to supply appropriate responses for at least those executions of the monitored code not identified as corresponding to a known exploit, and the patched variant further configured to log indicative data to characterize a post-patch exploit attempt in response to detecting the post-patch exploit attempt.

13. The intrusion detection system of claim 12,
    wherein the patched variant is further configured to log indicative data related to a detected attempt to exploit.

14. The intrusion detection system of claim 12,
    wherein the patched variant is further configured to identify at least one further target, based on indicative data related to a detected attempt to exploit.

15. The intrusion detection system of claim 14, wherein patched variant is further configured to initiate, in relation to the further target identification, one or more of:
    a warning regarding the further target;
    patching of the further target; and
    an additional protective measure for the further target.

16. The intrusion detection system of claim 12,
    wherein the patched variant directs a detected attempt to exploit the patched vulnerability to corresponding code.

17. The intrusion detection system of claim 16, wherein the corresponding code provides service-appropriate responses for at least some access attempts identified as corresponding to a known exploit.

18. The intrusion detection system of claim 16, wherein the corresponding code is implemented, at least in part, by the patched variant.

19. An apparatus comprising:
   code executable on a computer system; and
   means for patching an exploit of a vulnerability of the code; and
   means for checking for a signature for post-patch attempts to exploit the vulnerability in the patched code, and in response to detecting a subsequent attempt to exploit the vulnerability in the patched code, logging indicative data to characterize a post-patch attempt to exploit the patched vulnerability.

20. A computer-readable storage medium storing instructions that when executed by a computer cause the computer to perform a method comprising:
   patching an exploit of a vulnerability of code on a computer system;
   including, as part of the patch, a mechanism to check for a signature of the exploit in connection with post-patch execution of the code; and
   in response to detecting a subsequent attempt to exploit the vulnerability in the patched code, the mechanism logs indicative data to characterize a post-patch attempt to exploit the patched vulnerability.

21. The computer-readable storage medium of claim 20, wherein the method further comprises:
   directing an attempt to exploit the patched vulnerability to a corresponding implementation of the code.

22. The computer-readable storage medium of claim 20, wherein the method further comprises introducing the patch into an instance of the computer system otherwise susceptible to the vulnerability.

23. The computer-readable storage medium of claim 20, wherein the computer-readable storage medium is at least one computer readable medium selected from the set of a disk, a tape, a magnetic storage medium, an optical storage medium, a semiconductor storage medium, and an electronic storage medium.

* * * * *

UNITED STATES PATENT AND TRADEMARK OFFICE
CERTIFICATE OF CORRECTION

PATENT NO. : 7,647,637 B2  Page 1 of 1
APPLICATION NO. : 11/207341
DATED : January 12, 2010
INVENTOR(S) : Schuba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1181 days.

Signed and Sealed this

Sixteenth Day of November, 2010

David J. Kappos
*Director of the United States Patent and Trademark Office*